July 4, 1972  AKEMASA OTANI  3,674,444
IRON SCRAP BUNDLES

Filed Sept. 22, 1966  2 Sheets-Sheet 2

INVENTOR
AKEMASA OTANI
BY *PENDLETON, NEUMAN,
SEIBOLD & WILLIAMS*
ATTORNEY

United States Patent Office 3,674,444
Patented July 4, 1972

3,674,444
IRON SCRAP BUNDLES
Akemasa Otani, 4, 2-chome, Asakusa Hashiba-cho,
Taito-ku, Tokyo, Japan
Filed Sept. 22, 1966, Ser. No. 581,288
Claims priority, application Japan, Mar. 7, 1966,
41/13,687; Mar. 28, 1966, 41/18,709
Int. Cl. B21c 37/00
U.S. Cl. 29—186
7 Claims

ABSTRACT OF THE DISCLOSURE

A scrap iron bundle adapted to be introduced into a melting furnace. The bundle comprises a body formed from a plurality of iron scraps compacted together, the body having hollows therein which increase the area of heat transfer and promote melting of the bundle.

---

The present invention relates to scrap iron bundles which are readily meltable in a furnace and also self-refinable, and to methods for making such bundles.

According to this invention, bundles of the type mentioned above can be obtained during the piling and compacting operation of iron scraps, by forming holes and/or grooves in the interior and/or in the external surfaces of the bundle being molded to thereby increase the area of heat transfer. At the same time, deoxidizer, decarbonizer, and other refining agents, such as quick lime, limestone, manganese oxide (manganese ore), iron scale, etc., may be added or incorporated into said bundle, and the outer corners and edges of the bundle may be rounded so that it will be less likely to cause damage to the furnace wall during the steel making operation.

Conventional iron scrap bundles have been formed by compacting or press molding iron scraps; and because they are generally strongly and tightly compacted to avoid crumbling or fracture, it is often difficult to efficiently heat these conventional bundles by conduction in the furnace. Moreover, such bundles often have sharp edges or corners which can damage the furnace during the melting operation.

Since the bundles according to the present invention are strongly compacted, there is no risk of their crumbling or fracture. And at the same time, they can be quickly and thoroughly melted in the furnace because the holes and/or grooves formed therein serve to increase the area of heat transfer and thereby substantially promote the heating and melting of the bundle. The rounded corners and edges prevent injury to the interior portions of the furnace. Such features of the invention insure the provision of useful iron scrap bundles.

Further, during the formation of the bundles of the present invention, deoxidizers, desulfurizers, reducing agents, and other refining agents—such as silicon, calcium oxide, coke, iron scale, manganese ore, fluorite, carbide, burnt lime packed in vinyl bags, or the like—are conveniently added to the bundles, so that deoxidizing, decarbonizing, reducing and other refining actions can take place during the melting operation of the bundles in the furnace.

Figure 1A:
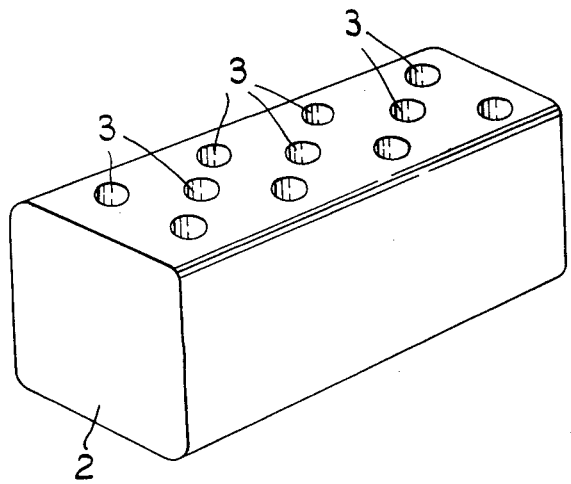
Figure 1B:
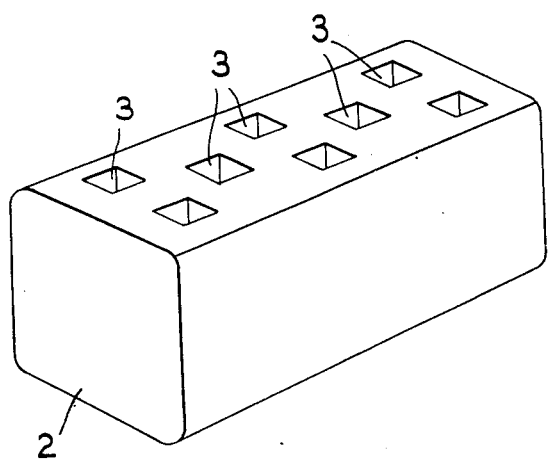
Figure 1C:
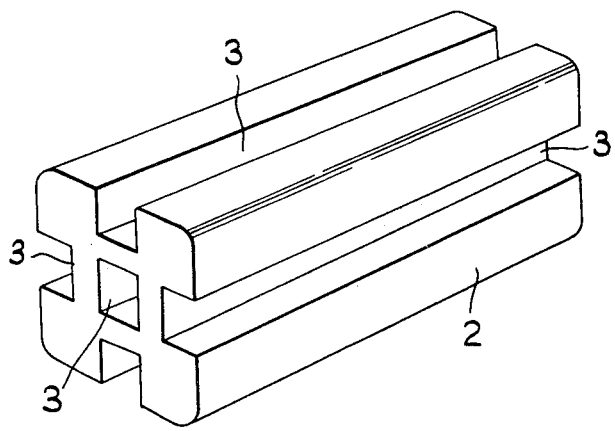
Figure 2A:
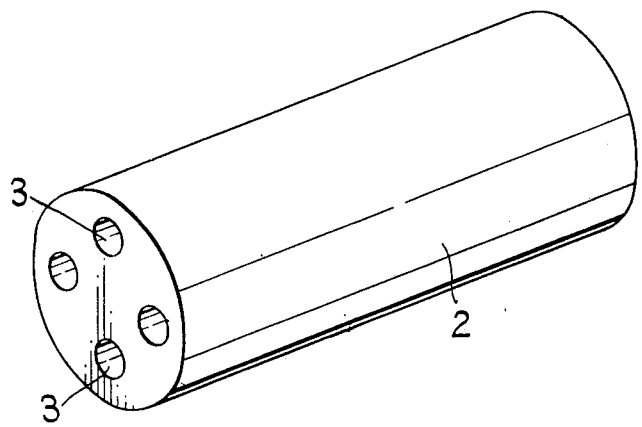
Figure 2B:
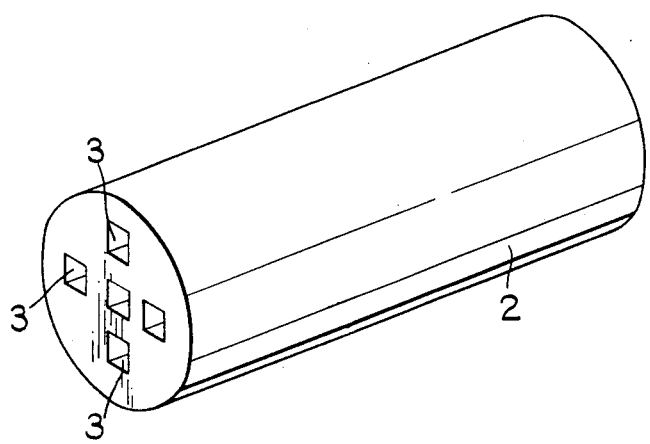
Figure 2C:
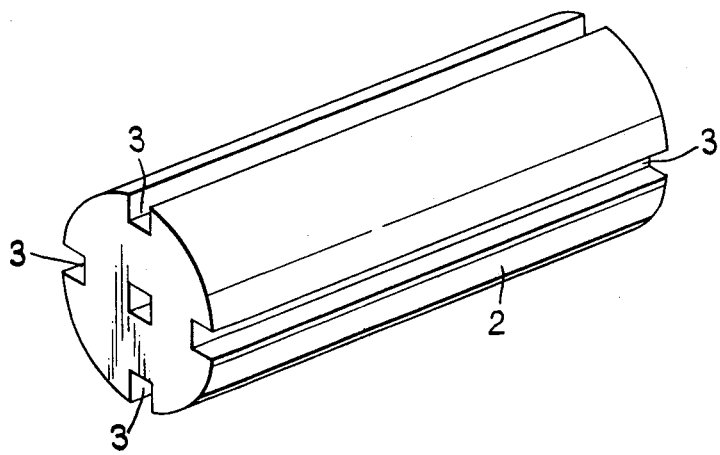

These and other features and advantages of the present invention will become apparent from consideration of the following description and the accompanying drawings wherein:

FIGS. 1a, 1b and 1c are perspective views showing rectangular-shaped iron scrap bundles made according to the invention; and FIGS. 2a, 2b and 2c are perspective views of cylindrical-shaped iron scrap bundles made according to the invention.

Referring now to the drawings, it will be seen that a plurality of iron scraps are pressed or otherwise firmly compacted to form a scrap iron bundle 2. This bundle may be formed in any shape: for example, it may have a rectangular shape, as shown in FIGS. 1a–1c, or it may be cylindrically shaped, as shown in FIGS. 2a–2c. The bundle is provided with hollows 3 which may consist of circular, rectangular or other suitably shaped holes (see, for example, FIGS. 1a and 1b) or external grooves (see FIG. 1c).

The invention will now be illustrated by the following examples:

EXAMPLE 1

For making iron scrap bundles from discarded cars, the cars are charged into a heating furnace or incinerator and heated to a temperature of about 400° C.–1,000° C. to thereby melt and remove non-ferrous materials such as glass, lead, aluminum, copper, etc. The incinerated cars are then fed one by one, or in a group of two or three, into a compacting or pressing apparatus or mold and, after a suitable number of cars have been charged into the apparatus, the pile is strongly compacted to form a pure iron scap bundle. During the compacting operation, the corners and edges of the bundle are made rounded and holes and/or grooves are formed in the interior and/or in the external surfaces of said bundle, as shown in the drawings, in a hydraulic cylinder press or the like. Rounding of the corners and edges of the bundle is accomplished by the use of a mold or compacting apparatus which has complementary rounded corners and edge configurations, or by the machining of the bundle subsequent to compaction.

When manufacturing iron from such an iron scrap bundle, the bundle is charged into a melting furnace, such as an open-hearth furnace, an electric furnace or the like, for heating and melting the bundle. Since the bundle is formed with holes and/or grooves so as to increase its area of heat transfer, the bundle can be quickly and efficiently heated in the furnace, and thus readily melted although the bundle has been strongly compacted. On the other hand, with such strongly and tightly compacted bundles, there is no risk of their being crumbled or fractured when they are being conveyed or thrown into the furnace. Moreover, the rounded corners and edges of the bundle prevent the interior equipment of the furnace, such as structural bricks, from being broken, thus insuring safe operation.

EXAMPLE 2

In the case of the manufacture of scrap iron bundles from discarded cars, the cars are charged into a heating furnace and heated to a temperature of about 400° C.–1,000° C. to thereby melt and remove non-ferrous materials such as glass, lead, aluminum, copper, etc. The remaining scrap materials are then transferred into the compacting apparatus and strongly compacted to form a pure iron scrap bundle in the manner similar to that described in Example 1.

In accordance with the invention, a deoxidizer, reducing agent, or other refining agent, such as quick lime, limestone, manganese oxide, silicon, coke, iron scale, fluorite, carbide, etc., is incorporated between the layers of scraps of suitable thickness, and these scraps are then integrally compacted to form the iron scrap bundle.

The addition of the refining agents is performed each time a car or group of cars is positioned in the compacting mold. The compacting operation may be carried out after a suitable quantity of cars for the formation of the bundle have been charged into the mold, or it may be carried out by alternately charging and partially compacting a few cars at a time and, when a suitable quantity of cars have been partially compacted, then finally compacting the partially compacted cars to form the desired bundle. In this latter operation, means may be provided for performing such partial compacting operations.

This iron scrap bundle, when introduced into, and heated in, the furnace, can be quickly crumbled and melted under the immediate action of the incorporated deoxidizer, reducing agent, and other refining agents, and this results in improved iron manufacturing having an extremely high yield.

Further, the bundle is formed with suitable holes and/or grooves in the interior and/or in the external surface thereof by means of a hydraulic cylinder press or the like so as to promote the melting of said bundle.

EXAMPLE 3

In the case of usual iron scraps, they are charged into the compacting apparatus by a magnetic collector or other suitable means, and compacted to form a scrap bundle by taking steps similar to those described in Example 1.

It will be obvious to those skilled in the art that many changes and modifications may be made from the above description and examples without departing from the spirit and scope of the invention and accordingly the invention is not to be limited except by the following claims.

What is claimed is:

1. A scrap iron bundle adapted to be introduced into a melting furnace, said bundle comprising a compact body formed from a plurality of iron scraps, said body having a plurality of substantially parallel, spaced hollows therein which have a length or depth at least approaching that of said body and which increase the surface area of the body and thereby promote heating and melting of the bundle.

2. The scrap iron bundle of claim 1 wherein the hollows are spaced exterior grooves.

3. The scrap iron bundle of claim 1 wherein the hollows are spaced exterior grooves and at least one interior opening.

4. The scrap iron bundle of claim 1 wherein the hollows are interior openings.

5. The scrap iron bundle of claim 1 wherein said body has refining agents uniformly dispersed therein.

6. The scrap iron bundle of claim 1 wherein said body has rounded edges and corners.

7. A metal scrap bundle adapted to be introduced into a melting furnace, said bundle comprising a compact body formed from a plurality of metal scraps, said body being provided with a plurality of substantially parallel, spaced hollows having a length at least approaching that of said body which increase the surface area of the body and thereby promote heating and melting of the bundle.

References Cited

UNITED STATES PATENTS

| | | | |
|---|---|---|---|
| 140,383 | 7/1873 | Pevey | 75—44 |
| 316,209 | 4/1885 | Westerman | 75—44 |
| 3,323,447 | 6/1967 | Tezuka | 100—238 |
| 3,371,599 | 3/1968 | Tezuka | 100—232 |
| 146,092 | 12/1873 | Parmelee | 75—44 X |
| 1,354,492 | 10/1920 | Jones | 75—44 X |
| 2,100,537 | 11/1937 | Conway | 29—184 X |
| 3,180,722 | 4/1965 | Swartz | 75—44 X |

L. DEWAYNE RUTLEDGE, Primary Examiner

J. M. DAVIS, Assistant Examiner

U.S. Cl. X.R.

29—185, 187.5; 75—44 S